(12) United States Patent
Hamblin

(10) Patent No.: US 11,932,331 B2
(45) Date of Patent: Mar. 19, 2024

(54) EXTERNAL TRACTION DEVICE FOR ENDLESS TRACKS

(71) Applicant: Chains for Tracks, Inc., McCall, ID (US)

(72) Inventor: James Paul Hamblin, McCall, ID (US)

(73) Assignee: Chains for Tracks, Inc., McCall, ID (US)

( * ) Notice: Subject to any disclaimer, the term of this patent is extended or adjusted under 35 U.S.C. 154(b) by 0 days.

(21) Appl. No.: 18/379,594

(22) Filed: Oct. 12, 2023

(65) Prior Publication Data

US 2024/0034425 A1 Feb. 1, 2024

Related U.S. Application Data

(60) Provisional application No. 63/478,731, filed on Jan. 6, 2023.

(51) Int. Cl.
*B62D 55/28* (2006.01)

(52) U.S. Cl.
CPC .................................... *B62D 55/28* (2013.01)

(58) Field of Classification Search
CPC ..... B62D 55/28; B62D 55/283; B62D 55/286
See application file for complete search history.

(56) References Cited

U.S. PATENT DOCUMENTS

| 1,695,657 | A | 12/1928 | Kegresse | |
|---|---|---|---|---|
| 7,901,015 | B1 * | 3/2011 | Anderson | B62D 55/28 305/51 |
| 8,016,369 | B2 * | 9/2011 | Breton | B62D 55/28 305/180 |
| 9,365,250 | B1 * | 6/2016 | Somers | B62D 55/275 |
| 9,862,436 | B2 * | 1/2018 | Burling | B62D 55/286 |
| 9,950,757 | B2 * | 4/2018 | Tibbits | B62D 55/28 |
| 10,625,798 | B2 * | 4/2020 | Lafreniere | B62D 55/28 |
| 10,967,925 | B2 * | 4/2021 | Wilson | B62D 55/286 |
| 11,390,341 | B2 * | 7/2022 | Burling | B62D 55/28 |
| 11,427,041 | B2 | 8/2022 | Young | |
| 11,560,191 | B2 * | 1/2023 | White | B62D 55/28 |
| 2003/0184157 | A1 * | 10/2003 | McNutt | B62D 55/286 305/180 |
| 2018/0127037 | A1 | 5/2018 | Lafreniere et al. | |
| 2021/0147015 | A1 | 5/2021 | Blanchard | |
| 2021/0214028 | A1 | 7/2021 | Young | |
| 2022/0017164 | A1 * | 1/2022 | Burling | B62D 55/28 |
| 2022/0258817 | A1 | 8/2022 | Blanchard | |
| 2022/0266932 | A1 * | 8/2022 | Michael | B62D 55/28 |

* cited by examiner

*Primary Examiner* — Jason R Bellinger

(74) *Attorney, Agent, or Firm* — Scott D. Swanson; Shaver & Swanson

(57) ABSTRACT

A traction improvement device provides increased traction to a tracked vehicle. The traction improvement device has two opposing brackets that are connected to opposite edges or flanges of a track of a tracked vehicle. A chain extends between the brackets. At least one of the brackets is a tensioner bracket that is configured to adjust the tension of the chain. The tension adjustment provides tension to the chain extending between the brackets, securing the traction improvement device on the outer surface (or gripping surface) of the track.

10 Claims, 7 Drawing Sheets

EXTERNAL TRACTION DEVICE FOR ENDLESS TRACKS

CROSS-REFERENCE TO RELATED APPLICATIONS

This application claims the benefit of U.S. Provisional Application No. 63/478,731, filed Jan. 6, 2023 the disclosure of which is incorporated by reference.

TECHNICAL FIELD

The disclosure generally relates to the field of traction improvement devices for tracked vehicles. Particular embodiments relate to traction improving chains for use with tracked vehicles, in particular compact track loaders and other similar tracked vehicles.

BACKGROUND

A variety of track driven machines are utilized in construction and agriculture. These include compact track loaders, often called compact skid steers. An example of a skid steer is shown in FIG. 1. Typically, a track consists of track formed in an endless loop having a generally flat treaded outer side and a flat inner side having a series of projections that are driven by a drive sprocket.

Alternatively, at least some of these machines can be provided with wheels and tires instead of the tracks. However, the tracked surfaces are often considered more beneficial in utilitarian environments. One disadvantage of the tracked skid steers and other similar tracked vehicles is the tracks do not function well in snow or other slick or reduced friction surfaces such as mud. In contrast, a benefit of the wheeled propelled machines is that tire chains can be provided for the tires of a wheeled propelled machine. What is needed is a mechanism to allow for friction enhancing devices utilizing chains to be used on the devices.

SUMMARY

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

A traction improvement device is disclosed. The device is for use on a tracked vehicle, such as a skid steer. The device has two opposing brackets with a chain extending between the brackets. At least one of the brackets is a tensioner bracket that is configured to adjust the tension on the chain. In use each of the brackets is positioned on an opposite edge of a track of the vehicle. The chain extends across the gripping surface of the track between the brackets. The brackets serve to secure the device to the opposing edges of the track.

The tensioning bracket is configured with a tensioner to adjust the tension in the chain. This tensioner utilizes a bolt extending through a wall of the bracket. In a preferred embodiment the bolt extends through a vertical wall of the bracket such that the bolt extends from the wall to the chain along the gripping surface of the track.

In a preferred embodiment the second bracket is a fixed bracket. The chain is preferably fixedly attached to the fixed bracket. This can be by welded attachment, or other attachment. In a preferred embodiment one or more links of the chain is welded to the fixed bracket.

The brackets each has an arm that extends along the underside of the track on the opposite side of the track from the gripping surface and chain. The brackets are preferably constructed in a U shape such that one arm of the U extends along the top or gripping surface of the track, and a second arm extends along the bottom of the track.

The tensioner utilizes a bolt that extends through a wall of the bracket. This wall of the bracket is vertically oriented when the device is positioned on a track on a tracked vehicle. The bolt extends through the wall and along the outer surface, or gripping surface, of the track to the chain. The bolt is configured in one of two preferred configurations. In the first configuration the bolt rotates into a nut attached to the chain to adjust tension in the device. The head of the bolt is positioned on the opposite side of the wall from the chain such that the head of the bolt rotates against the wall. As the bolt head is rotated, for example with a wrench or socket, the bolt threads into or out of a nut attached to the chain, causing the nut to draw toward the head (tightening the chain) or away from the head (decreasing tension on the chain). The nut can be welded to the chain or otherwise attached to the chain.

In the second embodiment the shank of the bolt extends through the wall with the nut positioned on the opposite side of the wall from the chain. The head of the bolt can be in an eye or similar configuration for attaching to the chain either directly or indirectly. In this embodiment the nut is rotated to draw the shank of the bolt toward or away from the opposing bracket, thus increasing tension or decreasing tension on the chain.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE FIGURES

Figure 1:
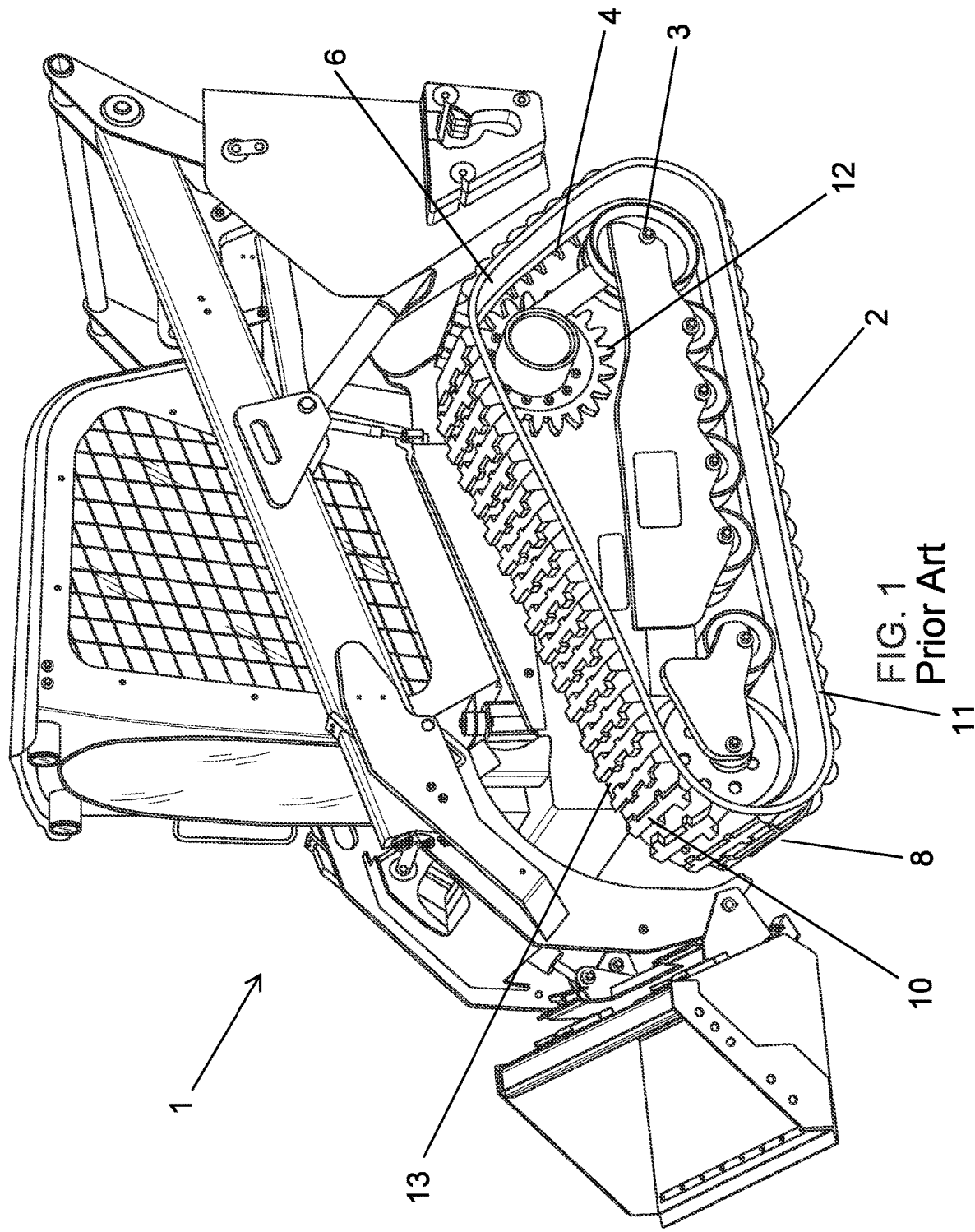
FIG. 1 is a perspective view of a skid steer having a pair of tracks for propulsion.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

Typically, the outer surface has channels that extend between the treads. The endless track has drive projections 4 on an underside 6 of the track. A drive sprocket 12 propels the track around the track drive system by engaging the drive projections. The depicted track rotates in a counterclockwise direction to propel the skid steer forward and in a clockwise direction to move the skid steer in reverse. A second track is provided on the opposing side of the skid steer that rotates in the opposite direction. Coordinated rotation of each track causes the skid steer to move forward or in reverse, and to turn left or right.

What is disclosed is a chain apparatus for installing one or more chains across the outer surface read of a tracked vehicle. The apparatus utilizes two opposing U-shaped brackets or clamps that are positioned on the opposing sides of the flange. A length of chain comprising chain links extends between the two opposing brackets or clamps. In a preferred embodiment, at least one tensioner is provided to adjust the tension the tension of the length of chain extending between the two clamps or brackets.

FIG. 1 illustrates a typical embodiment of a compact track loader (often called a skid steer) having endless track 2 driven by a track drive system. 3. The outer side 8 or surface of the track has a series of treads 10 that can be provided in a variety of configurations for providing traction as the track rotates. The band forms two flanges 11, 13 at opposing sides of the band.

Figure 2:
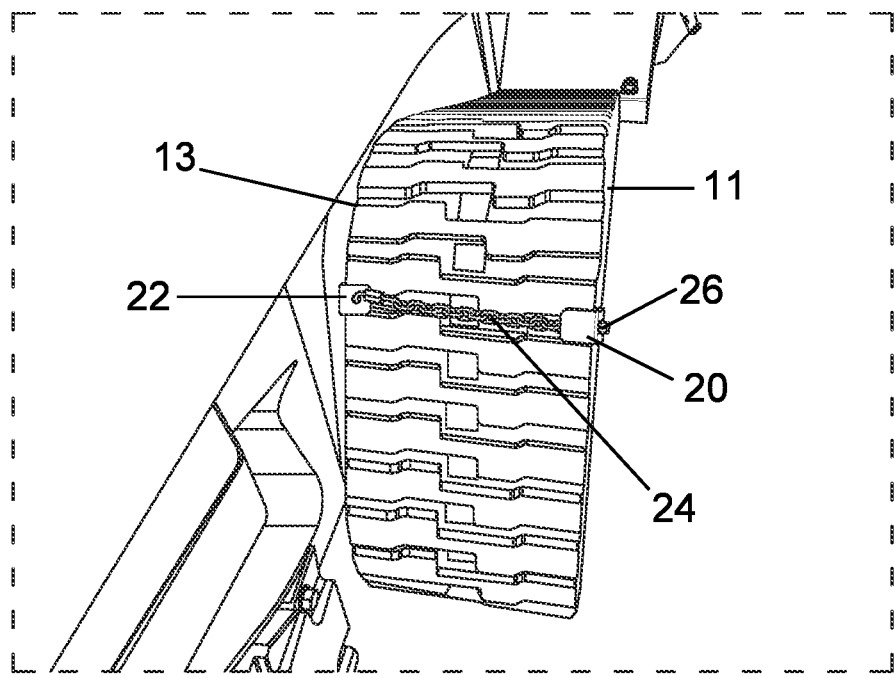
FIG. 2 is a perspective view of an embodiment of the invention connected to a track of the skid steer of FIG. 1.

FIG. 2 illustrates an example of the an embodiment of the invention positioned in a groove extending across the treads of a tracked vehicle. The two opposing brackets or clamps 20, 22 are positioned on the opposite flanges of the track with a length of chain 24 extending between the brackets. In the orientation of the depicted image, the bracket on the right-hand side utilizes a tensioner 26 configured for adjusting the tension of the chain. This bracket is referred to as the tensioner bracket. The tensioner of the device is provided in this disclosure in two different embodiments. In a first embodiment depicted in FIG. 2 an eye bolt is connected to the chain at the eye of the bolt. The shank of the bolt extends through a wall of the bracket. A nut is positioned on the shank on the opposite side of the bracket. Rotating the nut on the shank clockwise draws the shank of the eye bolt through the wall to tighten the chain. Rotating the nut counterclockwise loosens the tension on the chain. In a second embodiment the head of the bolt is positioned on the opposite side of the wall. The nut is preferably attached to the chain and the shank of the bolt, with rotation of the head of the bolt causing rotation of the shank in the nut, thus tightening and loosening the chain. While two embodiments of a tensioner are disclosed, alternate embodiments can be used without deviating from the scope of the inventive concepts disclosed herein.

Figure 3:
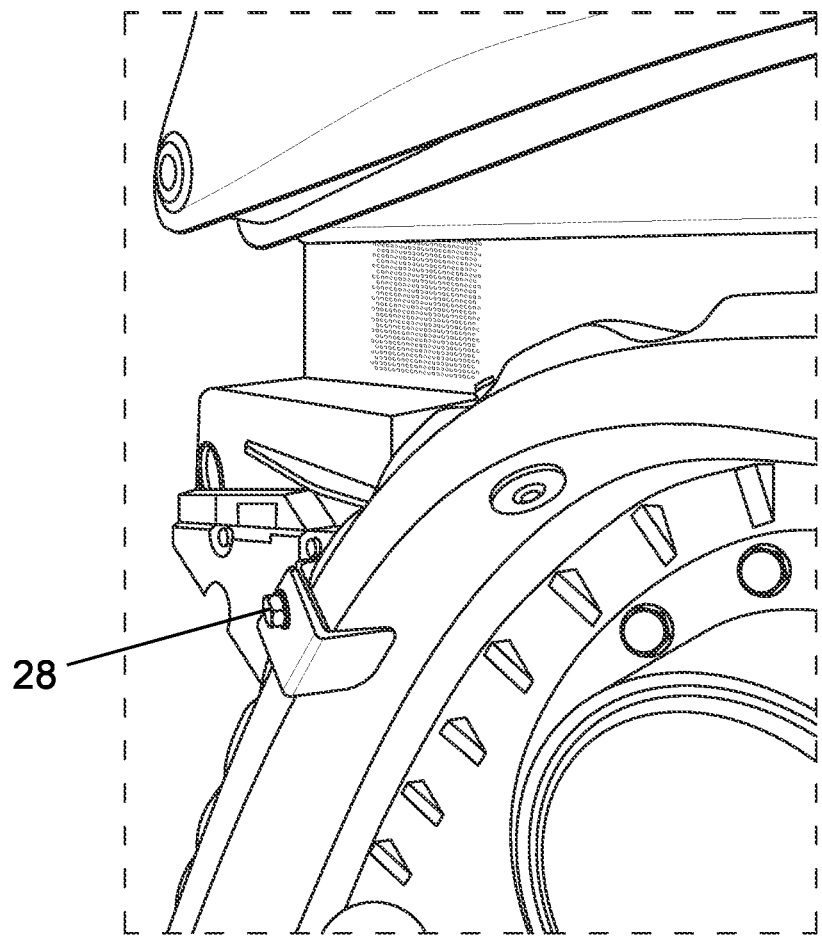
FIG. 3 is a perspective view of the tensionable end of the embodiment of the invention shown in FIG. 2 attached to the skid steer.

FIG. 3 illustrates the bracket or clamp 22 of FIG. 2 positioned on the flange or edge of the track. The clamp is configured with a width for placement on the flange of the endless track. The tensioner for tensioning the chain includes a nut 28 that is connected to a bolt connected to an end of the length of chain. Tightening the nut draws the bolt through the base of the U-shaped clamp, causing the tension of the chain to increase.

Figure 4:
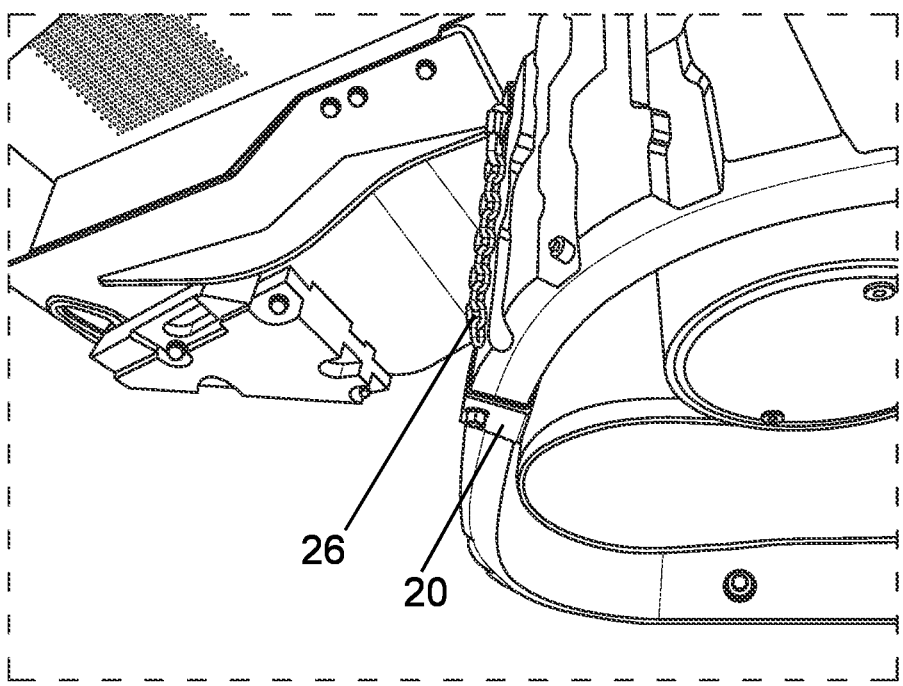
FIG. 4 is a second perspective view of the embodiment of the invention connected to a track of the skid steer as illustrated in FIG. 2.
Figure 5:
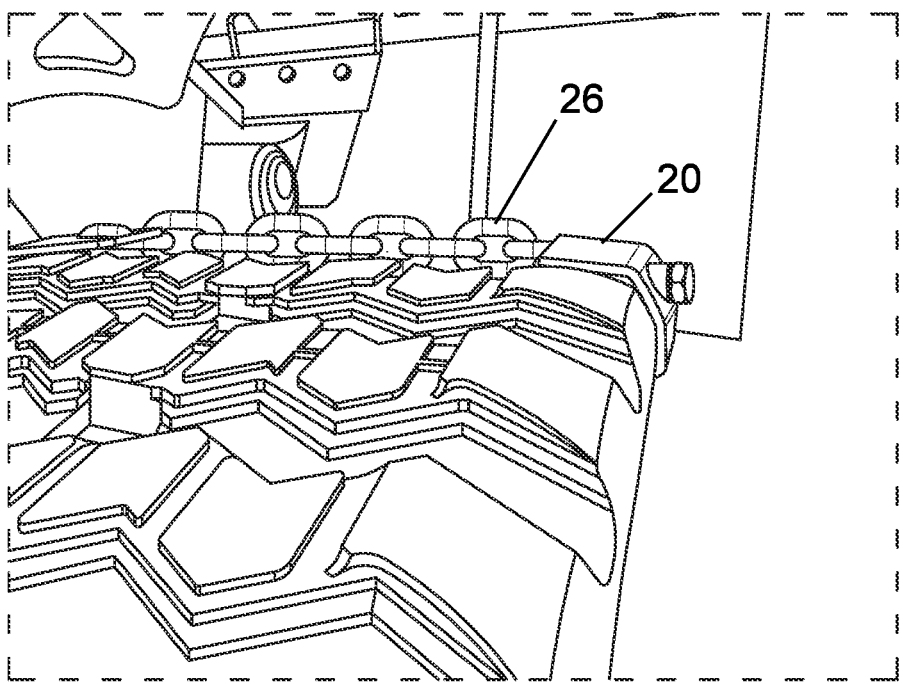
FIG. 5 is a perspective view of a second disclosed embodiment of the invention attached to a track of a skid steer.

FIGS. 4 and 5 illustrate additional views of the device having the tensioner bracket secured to a flange of the track.

Figure 6:
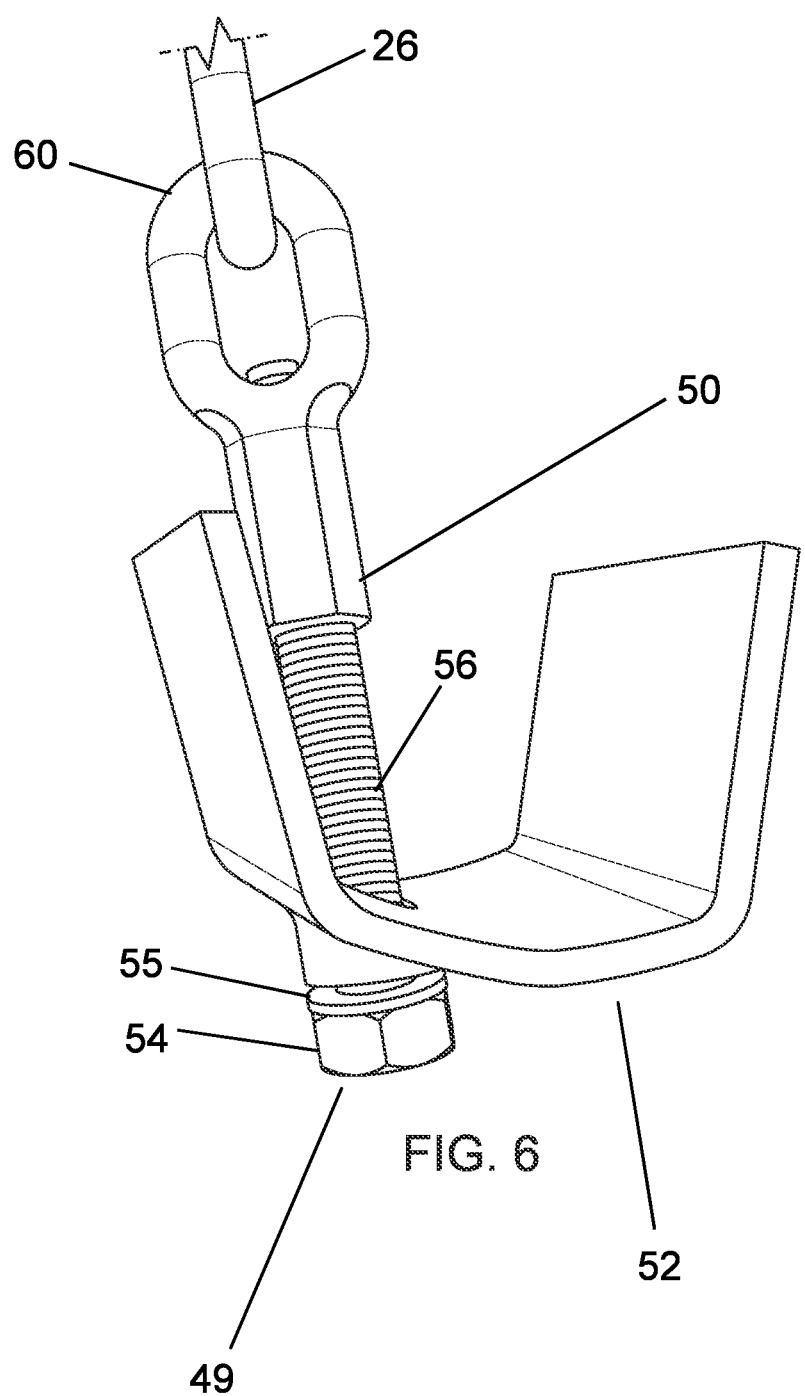
FIG. 6 is a perspective view of a preferred embodiment of the tensionable end of the invention as depicted in both the first embodiment and second disclosed embodiment of the invention.
Figure 7:
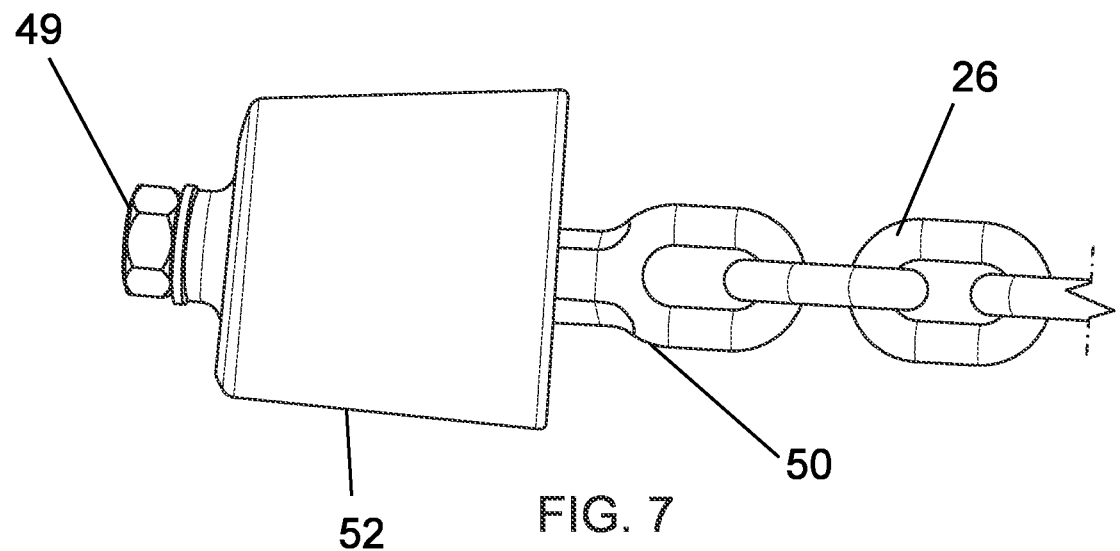
FIG. 7 is a top view of the tensionable end of the invention as depicted in FIG. 6.

FIG. 6 illustrates an embodiment of a tensioner in which the tensioner is a bolt 49 that extends through a wall 52 of the tensioner bracket. The head 54 of the bolt is positioned on the opposite side of the wall from the chain 26. A washer 55 is positioned between the bolt head and the wall of the tensioner bracket. The threaded shank 56 of the bolt extends to a nut 50 that is threaded to the shaft to operatively connect the shaft to the chain 60. In the depicted embodiment the nut 50 is welded to a chain link, although the nut can be formed as a chain link or otherwise connected to the chain. FIG. 7 illustrates a top view of the tensioner bracket of FIG. 6.

Figure 8:
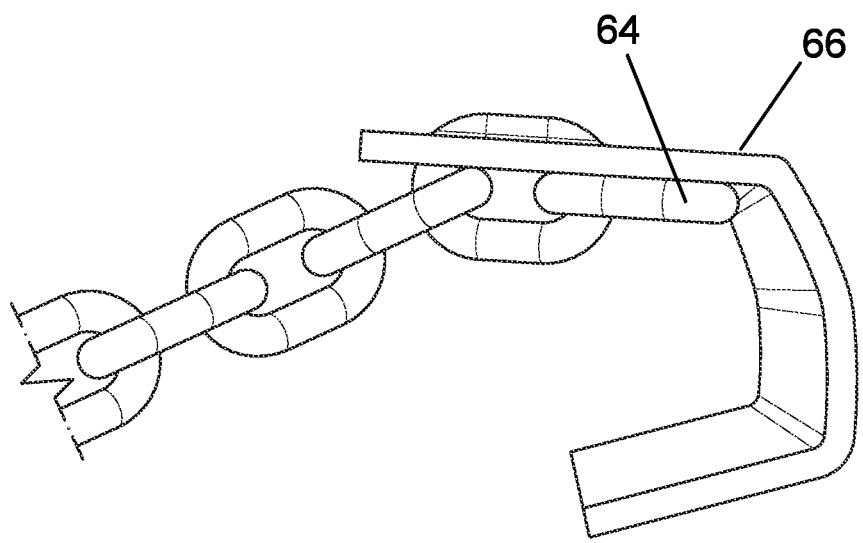
FIG. 8 is a perspective view of the fixed end of the invention in the second disclosed embodiment of the invention.
Figure 9:
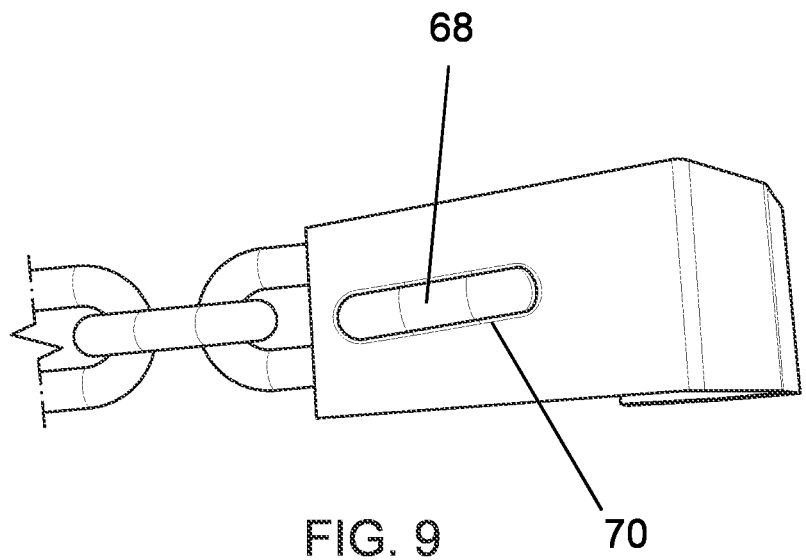
FIG. 9 is a perspective top view of the of the fixed end of the invention in the second disclosed embodiment of the invention.
Figure 10:
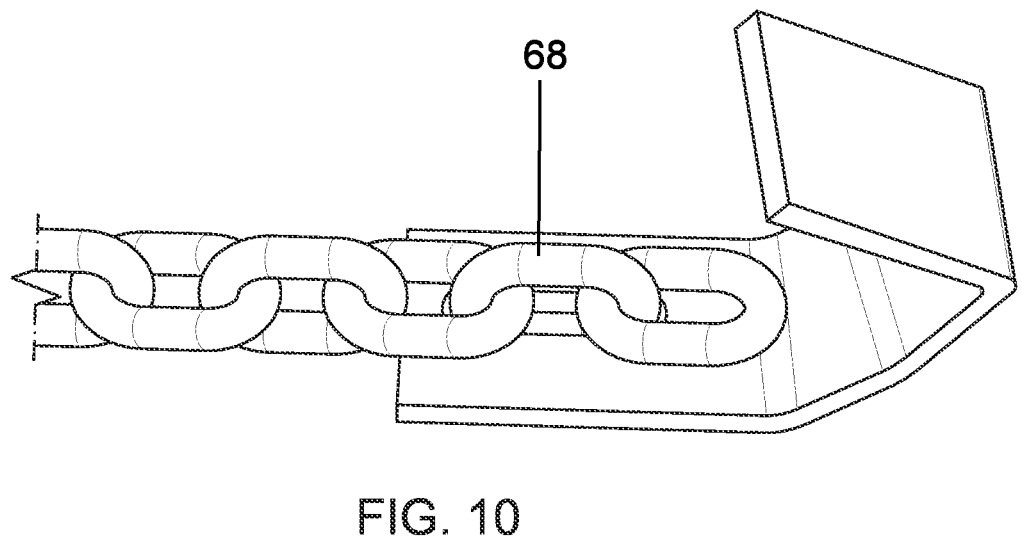
FIG. 10 is a perspective bottom view of the fixed end of the invention in the second disclosed embodiment of the invention.

FIGS. 8-10 illustrate a preferred embodiment of a fixed bracket. The chain is fixedly connected to the bracket, with the end chain link 64 welded to a wall 66 of the fixed bracket. To align the chain operatively with the fixed bracket, the second link 68 of the chain is positioned in a cut out 70 in the wall 66 of the bracket.

Figure 11:
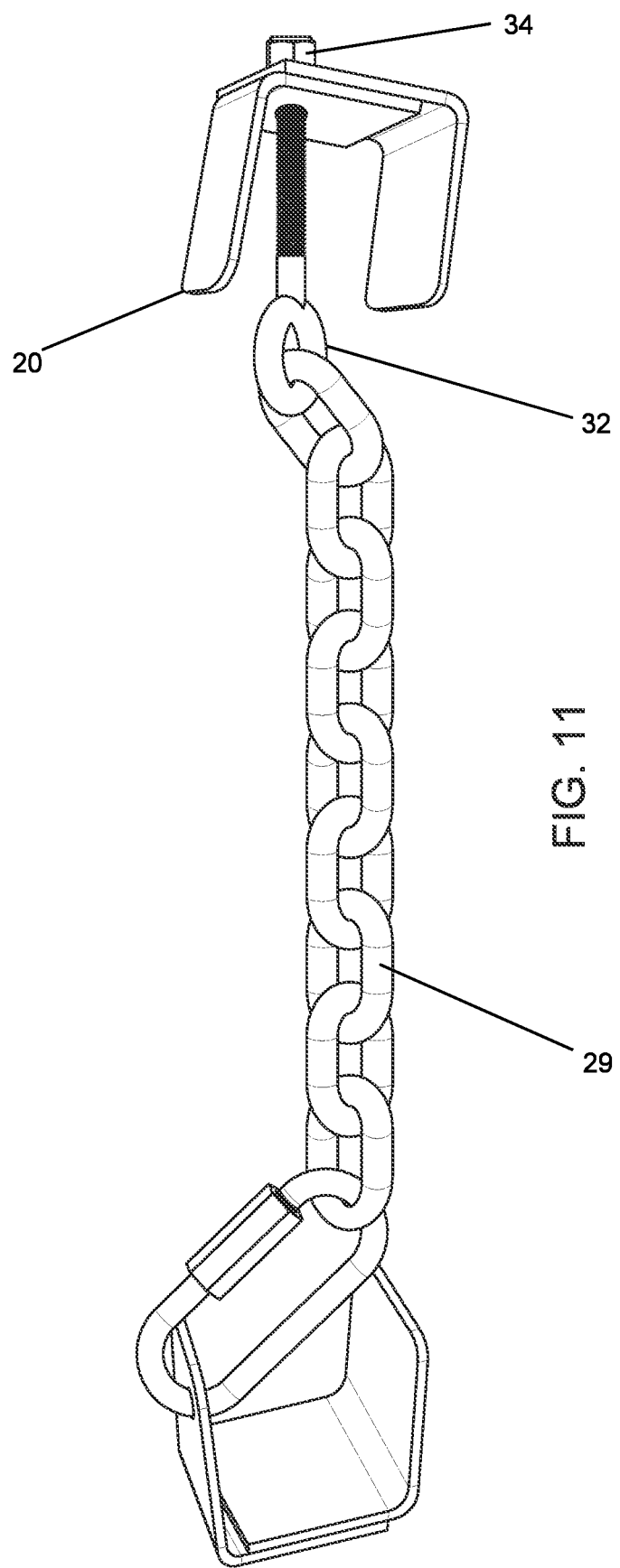
FIG. 11 is a perspective side view of an embodiment of the invention having an eye bolt and nut for tensioning the chain.

FIG. 11 illustrates an embodiment of a chain apparatus removed from the track. The two opposing brackets or clamps 20, 22 are illustrated. The chain 29 extends between the two clamps or brackets. In the depicted embodiment, the tensioner is formed as an eye bolt 32 that extends through the valley of the U-Shaped clamp. The eye bolt extends through the valley of the U-Shape bracket and is operatively connected to a 34 nut that is configured to be tightened and loosened. Tightening the nut draws the eye bolt through the bracket in the direction indicated by arrow T. In a preferred embodiment, the eye bolt extends between the opposing arms of the U-shaped bracket to provide protection to the eye bolt from the compressive forces of the machine upon the chain and eye bolt.

Still other features and advantages of the presently disclosed and claimed inventive concept(s) will become readily apparent to those skilled in this art from the following detailed description describing preferred embodiments of the inventive concept(s), simply by way of illustration of the embodiments contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

The invention claimed is:

1. A traction improvement device for a tracked vehicle, said device comprising:
   two opposing brackets wherein a first of said opposing brackets comprises a tensioner bracket, wherein said opposing brackets are configured to be secured to opposing edges of a track of the tracked vehicle,
   a chain extending between said opposing brackets and configured to span across a gripping surface of said track when said opposing brackets are secured to the opposing edges of said track; and
   wherein said tensioner bracket comprising a tensioner connected to said tensioner bracket, wherein said tensioner is configured to increase tension on said chain to secure said traction improvement device to said track, wherein said tensioner comprises a bolt extending through a wall of said tensioner bracket; and
   wherein each bracket has a bracket arm configured to extend along the opposite surface of the track from the chain.

2. The traction improvement device of claim 1 wherein a second bracket of said opposing brackets comprises a fixed bracket, wherein said chain is fixedly attached to said fixed bracket.

3. The traction improvement device of claim 1, wherein at least one of said brackets comprises a U-shape.

4. The traction improvement device of claim 2, wherein said fixed bracket comprises a U-shape.

5. The traction improvement device of claim 3, wherein said tensioner bracket comprises the U-shape.

6. The traction improvement device of claim 1 wherein said bolt comprises a head positioned exterior to said wall from said chain, wherein a shank of said bolt is connected to a nut connected to said chain, wherein rotation of said bolt head causes rotation of said shaft in said nut causing adjustment of the tension in said chain.

7. The traction improvement device of claim 6 wherein said nut is welded to a link of said chain.

8. The traction improvement device of claim 1, wherein said bolt comprises a first end attached to said chain, wherein a shank of said bolt extends away from said first end and through a wall of said tensioner bracket, wherein a nut is attached to said shank such that rotation of said nut adjusts tension on said chain.

9. The traction improvement device of claim 8 wherein said bolt comprises an eye bolt such that said first end of said bolt comprises an eye, wherein said eye is connected to said chain.

10. The traction improvement device of claim 2 wherein said chain is connected to said fixed bracket by a welded connection.

* * * * *